US009079584B2

(12) United States Patent
Yamane et al.

(10) Patent No.: US 9,079,584 B2
(45) Date of Patent: Jul. 14, 2015

(54) LONGITUDINAL FORCE CONTROL APPARATUS AND SADDLED VEHICLE HAVING THE SAME

(71) Applicant: YAMAHA HATSUDOKI KABUSHIKI KAISHA, Iwata-shi (JP)

(72) Inventors: Hayato Yamane, Iwata (JP); Hiroyuki Inoue, Iwata (JP); Takahiro Fujii, Iwata (JP); Yoshimichi Seki, Iwata (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 0 days.

(21) Appl. No.: 14/520,096

(22) Filed: Oct. 21, 2014

(65) Prior Publication Data

US 2015/0112569 A1 Apr. 23, 2015

(30) Foreign Application Priority Data

Oct. 21, 2013 (JP) .................................. 2013-218224

(51) Int. Cl.
*B60W 30/045* (2012.01)
*B60W 30/18* (2012.01)
*B60W 10/06* (2006.01)
*B60W 10/184* (2012.01)
*B60W 30/04* (2006.01)

(52) U.S. Cl.
CPC ............. *B60W 30/045* (2013.01); *B60W 10/06* (2013.01); *B60W 10/184* (2013.01); *B60W 30/04* (2013.01); *B60W 30/18145* (2013.01); *B60W 30/18172* (2013.01); *B60W 2030/043* (2013.01); *B60W 2300/36* (2013.01); *B60W 2520/125* (2013.01); *B60W 2520/14* (2013.01); *B60W 2520/18* (2013.01); *B60W 2520/28* (2013.01); *B60W 2720/106* (2013.01)

(58) Field of Classification Search
USPC ........................................................ 701/72
See application file for complete search history.

(56) References Cited

U.S. PATENT DOCUMENTS

| | | | | |
|---|---|---|---|---|
| 5,229,944 A * | 7/1993 | Yasuno | ........................... | 701/70 |
| 6,021,367 A * | 2/2000 | Pilutti et al. | .................... | 701/41 |
| 6,766,236 B1 * | 7/2004 | Lamela et al. | .................. | 701/50 |
| 6,816,804 B1 * | 11/2004 | Lee | ................. | 702/148 |
| 7,451,033 B2 * | 11/2008 | Xu et al. | .......................... | 701/70 |
| 7,529,600 B2 * | 5/2009 | Mori et al. | ........................ | 701/1 |
| 7,668,637 B2 * | 2/2010 | O'Dea | ............................ | 701/72 |
| 8,024,091 B2 * | 9/2011 | Takenaka et al. | ............... | 701/48 |
| 8,046,134 B2 * | 10/2011 | Huang et al. | .................... | 701/42 |

(Continued)

FOREIGN PATENT DOCUMENTS

JP 4402379 B2 1/2010
JP 2013-523532 A 6/2013

*Primary Examiner* — Thomas Tarcza
*Assistant Examiner* — Alex C Dunn
(74) *Attorney, Agent, or Firm* — Rabin & Berdo, P.C.

(57) ABSTRACT

Provided is a longitudinal force control apparatus. A lateral acceleration acquisition section acquires a lateral acceleration along a right-left direction acting on a vehicle. A bank angle acquisition circuit acquires a bank angle of the vehicle. A longitudinal force controller may decrease an absolute value of a longitudinal force at least with respect to a driving wheel of the vehicle based on the acquired lateral acceleration and the bank angle when it is determined that a calculated lateral-skid acceleration is equal to or greater than a predetermined threshold. The longitudinal force is a sum of forces along a front-rear direction acting on the driving wheel.

18 Claims, 11 Drawing Sheets

(56) References Cited

U.S. PATENT DOCUMENTS

| | | |
|---|---|---|
| 8,498,775 B2 * | 7/2013 | Yngve et al. ............... 701/32.9 |
| 8,639,412 B2 * | 1/2014 | Shiozawa et al. ........... 701/33.1 |
| 2007/0021896 A1 * | 1/2007 | O'Dea .......................... 701/70 |
| 2010/0114431 A1 * | 5/2010 | Switkes et al. ............... 701/41 |
| 2010/0131146 A1 * | 5/2010 | Nardi et al. .................. 701/29 |
| 2013/0090828 A1 | 4/2013 | Lemejda |
| 2014/0200780 A1 | 7/2014 | Watanabe et al. |

\* cited by examiner

LONGITUDINAL FORCE CONTROL APPARATUS AND SADDLED VEHICLE HAVING THE SAME

CROSS-REFERENCE TO RELATED APPLICATION

This application is based on, and claims priority to, Japanese Patent Application No. 2013-218224, filed on Oct. 21, 2013, the contents of which are incorporated herein by reference.

BACKGROUND

1. Technical Field

The present invention relates to a longitudinal force control apparatus. Moreover, the present invention also relates to a saddled vehicle having a longitudinal force control apparatus.

2. Description of the Related Art

The mechanism by which a lateral skid of a wheel occurs while a vehicle is curving is explained by reference to a friction circle. A friction circle is a circle which indicates maximum allowance for a gripping force of a wheel. FIG. 15 and FIG. 16 show relationships between forces acting on a wheel and a friction circle.

FIG. 15 shows a relationship when a vehicle is curving while maintaining a stable attitude. As shown in FIG. 15, it is when a resultant force of a longitudinal force and a cornering force (lateral force) occurring in a lateral direction (right-left direction) during curving fits within a friction circle that a wheel rotates stably without skidding. The longitudinal force is a sum of a driving force acting in the forward direction and a braking force acting in the rearward direction.

On the other hand, FIG. 16 shows a relationship when a lateral skid occurs while a vehicle is curving. As shown in FIG. 16, if the resultant force of the longitudinal force as a sum of the driving force and the braking force and the cornering force occurring during curving goes out of the friction circle, a wheel undergoes a lateral skid. A lateral skid will disturb the attitude of the vehicle.

For four-wheeled vehicles, longitudinal force control apparatuses for controlling the longitudinal force while curving are known. A saddled vehicle, unlike a four-wheeled vehicle, will curve with its vehicle body banking, however. Therefore, a longitudinal force control apparatus for a four-wheeled vehicle cannot be straightforwardly applied to a saddled vehicle.

Accordingly, a longitudinal force control apparatus for saddled vehicles is proposed in Japanese Patent No. 4402379 (hereinafter "Patent Document 1"). The apparatus of Patent Document 1 includes a lateral acceleration sensor and a yaw rate sensor mounted on a vehicle. This apparatus evaluates an output signal from the lateral acceleration sensor to determine whether the braking force is to be decreased or not. Based on an output signal from the yaw rate sensor, it is determined on which wheel the braking force is to be decreased.

However, in the apparatus of Patent Document 1, the lateral acceleration sensor which is mounted on the vehicle will tilt along with the vehicle during curving, thus being unable to detect an accurate lateral acceleration (i.e., an acceleration in the horizontal direction, which is orthogonal to the direction of gravity). This leads to a problem in that the detected value of lateral acceleration will vary with the bank angle.

FIG. 17 is a diagram for describing a detection value of the lateral acceleration sensor in the apparatus of Patent Document 1, illustrating a case where the vehicle body 62 is banked. When the vehicle body 62 is not banked, the lateral acceleration sensor can accurately detect acceleration along the horizontal direction. However, when the vehicle body 62 is banked to a certain angle (bank angle) $\beta$, as shown in FIG. 17, the lateral acceleration sensor will detect an acceleration along a direction (an orthogonal direction to the vehicle body center axis) which is inclined by angle $\beta$ with respect to the horizontal direction.

Therefore, in the apparatus of Patent Document 1, the detection value of the lateral acceleration sensor will vary with the magnitude of the bank angle $\beta$ during curving. As a result, the accuracy of detection of lateral acceleration will fluctuate, such that detection of a lateral skid of the wheel 61 becomes more difficult as the bank angle $\beta$ increases.

SUMMARY

The present invention has been made in view of the above problems, and an objective thereof is to provide a longitudinal force control apparatus which can exert a highly accurate longitudinal force control irrespective of the bank angle during curving, and to provide a saddled vehicle having such a longitudinal force control apparatus.

A longitudinal force control apparatus according to an embodiment of the present invention comprises: a lateral acceleration acquisition section configured to acquire a lateral acceleration, the lateral acceleration being an acceleration along a right-left direction acting on a vehicle; a bank angle acquisition circuit configured to acquire a bank angle of the vehicle; and a longitudinal force controller configured to decrease an absolute value of a longitudinal force at least with respect to a driving wheel based on the acquired lateral acceleration and bank angle, the longitudinal force being a sum of forces along a front-rear direction acting on a wheel, wherein, the longitudinal force controller includes a lateral-skid acceleration calculation circuit configured to at least calculate a lateral-skid acceleration of the driving wheel based at least on the lateral acceleration and the bank angle, and a judgment circuit configured to determine whether or not the calculated lateral-skid acceleration is equal to or greater than a predetermined threshold, the threshold being greater when a velocity of travel of the vehicle is in a second velocity range than when the velocity of travel is in a first velocity range, the second velocity range being on a higher-speed side of the first velocity range.

In one embodiment, the threshold is substantially constant in the first velocity range.

In one embodiment, the threshold increases as the velocity of travel increases in the second velocity range.

In one embodiment, the threshold is set so that reduction of longitudinal force by the longitudinal force controller is substantially not performed in a third velocity range which is on a yet higher-speed side of the second velocity range.

In one embodiment, the judgment circuit is capable of increasing or decreasing the threshold by substantially a same value across the entire velocity range.

In one embodiment, the longitudinal force control apparatus according to the present invention further comprises: a yaw rate sensor configured to detect a yaw rate of the vehicle; and a vehicle speed acquisition circuit configured to acquire the velocity of travel, wherein, the longitudinal force controller decreases the absolute value of the longitudinal force based not only on the lateral acceleration and the bank angle, but also on the yaw rate and the velocity of travel.

In one embodiment, the longitudinal force control apparatus according to the present invention further comprises a roll rate sensor configured to detect a roll rate of the vehicle, wherein the longitudinal force controller decreases the absolute value of the longitudinal force based also on the roll rate.

In one embodiment, the lateral-skid acceleration calculation circuit calculates the lateral-skid acceleration based not only on the lateral acceleration and the bank angle, but also on the yaw rate and the velocity of travel.

In one embodiment, the longitudinal force controller changes a decrease in the absolute value of the longitudinal force in accordance with a magnitude of the lateral-skid acceleration.

In one embodiment, the longitudinal force controller changes a decrease in the absolute value of the longitudinal force in accordance with a difference between the lateral-skid acceleration and the threshold, and/or with an amount of change of the lateral-skid acceleration per unit time.

In one embodiment, the longitudinal force control apparatus according to the present invention further comprises: a driving force estimation circuit configured to estimate a driving force acting on the driving wheel; a braking force estimation circuit configured to estimate a braking force acting at least on the driving wheel; and a longitudinal force estimation circuit configured to estimate a longitudinal force as a sum of the driving force and the braking force acting at least on the driving wheel.

In one embodiment, the longitudinal force controller is capable of decreasing or increasing the driving force to thereby reduce the longitudinal force.

In one embodiment, the longitudinal force controller is capable of decreasing an injected amount of fuel, decreasing a transmission torque of a clutch, decreasing an ignition frequency of a spark plug, and/or lagging an ignition timing of the spark plug, to thereby reduce the driving force.

In one embodiment, the longitudinal force controller is capable of decreasing or increasing the braking force to thereby reduce the longitudinal force.

A saddled vehicle according to an embodiment of the present invention comprises a longitudinal force control apparatus of the above construction.

In the longitudinal force control apparatus according to an embodiment of the present invention, the longitudinal force controller decrease the absolute value of the longitudinal force based on a lateral acceleration acquired by the lateral acceleration acquisition section and a bank angle acquired by the bank angle acquisition circuit, thereby being able to exert a highly accurate longitudinal force control, irrespective of the bank angle of the vehicle. Moreover, in the longitudinal force control apparatus according to an embodiment of the present invention, the longitudinal force controller includes a lateral-skid acceleration calculation circuit which at least calculates a lateral-skid acceleration of the driving wheel, and a judgment circuit which determines whether or not the calculated lateral-skid acceleration is equal to or greater than a predetermined threshold, thereby being able to exert a longitudinal force control which is in accordance with the lateral-skid acceleration of a wheel (at least the driving wheel), thus suitably stopping lateral skidding. Furthermore, in the longitudinal force control apparatus according to an embodiment of the present invention, the threshold (intervention threshold) used for the judgment by the judgment circuit is greater when the velocity of travel of the vehicle is in a relatively higher velocity range (second velocity range) than in a relatively lower velocity range (first velocity range). Therefore, it is possible to prevent unwanted intervention of longitudinal force control in a high-speed range, and prevent failure to exert longitudinal force control in situations where longitudinal force control is needed in a low-speed range. Thus, the longitudinal force control apparatus according to an embodiment of the present invention can suitably exert longitudinal force control at the timing needed by the rider.

When the intervention threshold is set so as to be substantially constant in the first velocity range, unwanted intervention of longitudinal force control in a low-speed range (or more specifically, a very-low-speed range) can be prevented.

Moreover, when the intervention threshold is set so as to increase as the velocity of travel increases in the second velocity range, unwanted intervention of longitudinal force control in a high-speed range can be prevented with greater certainty.

When the intervention threshold is set so that reduction of the longitudinal force by the longitudinal force controller is substantially not performed in a velocity range (third velocity range) which is on the higher-speed side of the second velocity range, it can be ensured that longitudinal force control is not exerted in a velocity range where turning motions are unlikely to be made. This can prevent unwanted interventions associated with vehicle body vibration or the like during a travel at a high speed.

The lateral-skid acceleration that is tolerable to a rider may vary depending on the riding skills of the rider and the road surface condition. When the judgment circuit is capable of increasing or decreasing the intervention threshold by substantially the same value across the entire velocity range, the aforementioned variation can be accommodated, thereby realizing a longitudinal force control which is adapted to the riding skills of the rider and the road surface condition.

The longitudinal force control apparatus according to an embodiment of the present invention may further include a yaw rate sensor which detects a yaw rate of the vehicle, and a vehicle speed acquisition circuit which acquires a velocity of travel of the vehicle. In this case, the longitudinal force controller is capable of decreasing the absolute value of the longitudinal force based not only on the lateral acceleration and bank angle, but also on the yaw rate and velocity of travel, whereby it is possible to exert longitudinal force control with a higher accuracy.

Moreover, the longitudinal force control apparatus according to the present invention may further include a roll rate sensor which detects a roll rate of the vehicle. In this case, the longitudinal force controller is able to decrease the absolute value of the longitudinal force based also on the roll rate in addition to the lateral acceleration, bank angle, yaw rate, and velocity of travel, so that it is possible to exert longitudinal force control with an even higher accuracy.

In the case where the longitudinal force control apparatus includes a yaw rate sensor and a vehicle speed acquisition circuit, it is preferable that the lateral-skid acceleration calculation circuit calculates lateral-skid acceleration based not only on the lateral acceleration and bank angle, but also on the yaw rate and velocity of travel.

The longitudinal force controller preferably changes the decrease in the absolute value of the longitudinal force in accordance with the magnitude of the lateral-skid acceleration. By changing the decrease in the absolute value of the longitudinal force in accordance with the magnitude of the lateral-skid acceleration, an appropriate longitudinal force control can be exerted.

Alternatively, it is also preferable for the longitudinal force controller to change the decrease in the absolute value of the longitudinal force in accordance with a difference between the lateral-skid acceleration and the threshold and/or an amount of change of the lateral-skid acceleration per unit time. An appropriate longitudinal force control can also be exerted by changing the decrease in the absolute value of the longitudinal force in accordance with a difference between the lateral-skid acceleration and the threshold and/or an amount of change of the lateral-skid acceleration per unit time.

Moreover, the longitudinal force control apparatus according to the present invention may further include: a driving force estimation circuit which estimates a driving force acting on the driving wheel; a braking force estimation circuit which estimates a braking force acting at least on the driving wheel; and a longitudinal force estimation circuit which estimates a longitudinal force as a sum of the driving force and braking force acting at least on the driving wheel. By estimating the driving force and braking force acting on the wheel, it becomes possible to estimate a longitudinal force which is a sum of the driving force and the braking force, thereby being able to accurately adjust the decrease in the absolute value of the longitudinal force.

The longitudinal force controller may reduce the longitudinal force by decreasing or increasing the driving force, or reduce the longitudinal force by decreasing or increasing the braking force.

Specifically, the longitudinal force controller is able to decrease the driving force by decreasing an injected amount of fuel, decreasing the transmission torque of the clutch, decreasing the ignition frequency of the spark plug, and/or lagging the ignition timing of the spark plug.

According to an embodiment of the present invention, there is provided a longitudinal force control apparatus which can exert a highly accurate longitudinal force control irrespective of the bank angle during curving, as well as a saddled vehicle having such a longitudinal force control apparatus.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Hereinafter, embodiments of the present invention will be described with reference to the drawings. Note that the present invention is not to be limited to the following embodiments.

In the present specification, the terms "detection" and "acquisition" are differentiated as follows, in principle.
(1) To "detect physical parameter a" means to obtain information concerning a value (measured value) of physical parameter a through measurement of physical parameter a.
(2) To "acquire physical parameter a" encompasses to "detect physical parameter a" and also to determine the value of physical parameter a based on information which is detected by a sensor or the like.

Moreover, "acquisition" may encompass the following operations, for example.
(2.1) calculating the value of physical parameter a by substituting a measured value into a predetermined arithmetic expression;
(2.2) referring to a table or a database which indicates correspondence between measured values and values of physical parameter a to read a value of physical parameter a corresponding to a measured value therefrom; and
(2.3) estimating a value of physical parameter a from the measured value.

For example, acquiring a yaw rate includes not only directly detecting a yaw rate by means of a yaw rate sensor, but also obtaining an estimated value of yaw rate through arithmetic operations of an output from elsewhere, e.g., an attitude angle sensor or a velocity sensor. This similarly applies to any physical parameter other than yaw rate, e.g., bank angle or the like.

<1. Schematic Construction of the Motorcycle>

Figure 1:
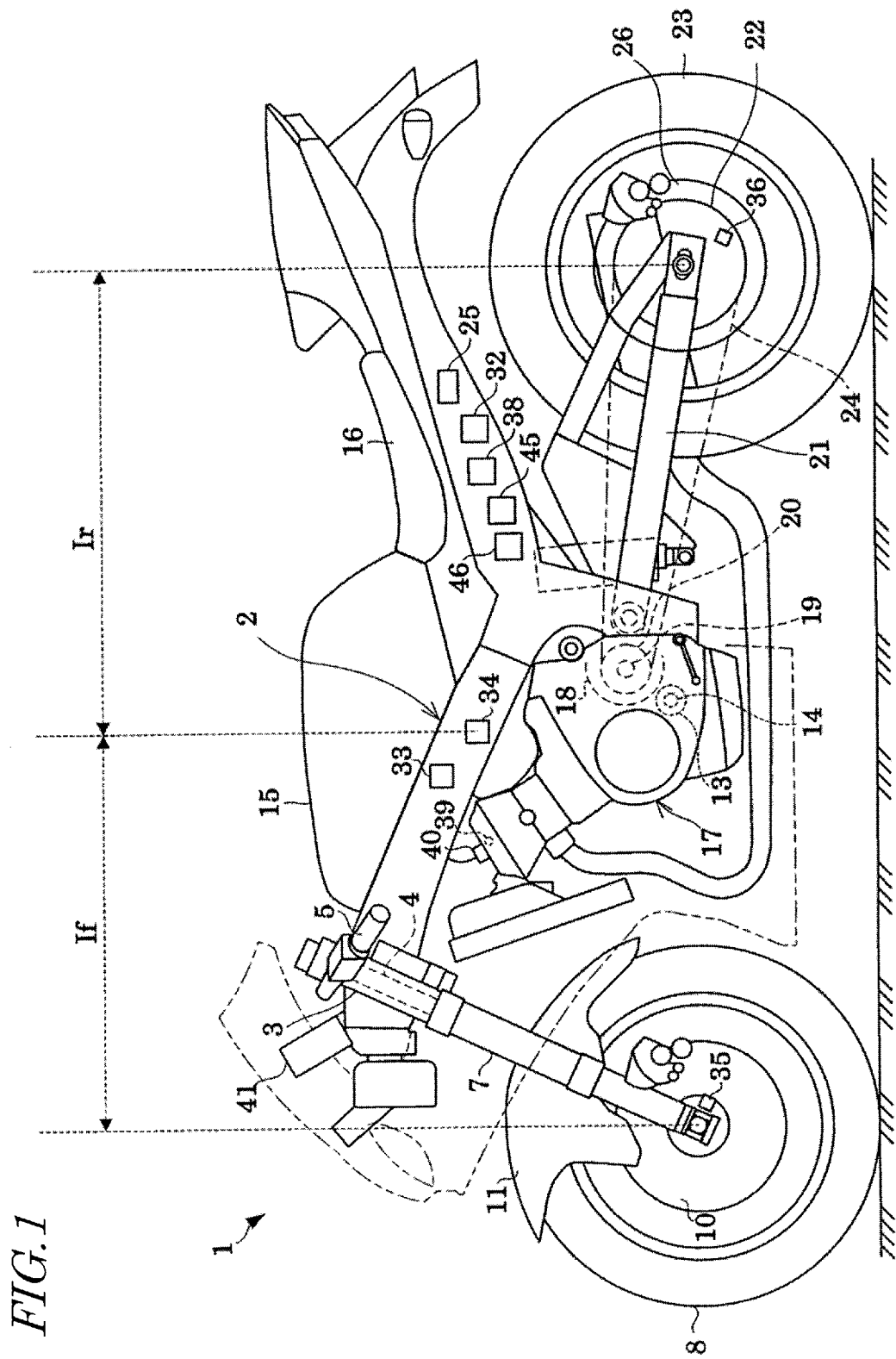
FIG. 1 is a side view schematically showing a motorcycle 1 according to an embodiment of the present invention.

First, with reference to FIG. 1, a schematic construction of a motorcycle 1 according to the present embodiment will be described. FIG. 1 is a side view schematically showing the motorcycle 1.

As shown in FIG. 1, the motorcycle 1 includes a main frame 2. A head pipe 3 is provided at an upper portion of the front end of the main frame 2. A steering shaft 4 is inserted in the head pipe 3.

Handle bars 5 are linked at an upper end of the steering shaft 4. A brake lever (not shown) is provided on the right handle bar 5. At a lower end of the steering shaft 4, a pair of front forks 7 which are capable of contraction and expansion are linked. This allows the front forks 7 to swing with the turning of the handle bars 5.

A front wheel 8 is rotatably attached at lower ends of the front forks 7. Vibration of the front wheel 8 is absorbed by the contraction and expansion of the front forks 7. Moreover, a front wheel brake 10 is attached at lower ends of the front forks 7, so that rotation of the front wheel 8 is braked with manipulation of the brake lever. A front wheel cover 11 is fixed to the front forks 7, above the front wheel 8.

A fuel tank 15 and a seat 16 are retained at an upper portion of the main frame 2 so as to flank each other in the front-rear direction. An engine 17 and a transmission 18 are retained by the main frame 2, below the fuel tank 15. A clutch 13 and a clutch actuator 14 for engaging or disengaging the clutch 13 are provided between the engine 17 and the transmission 18.

The transmission 18 includes a drive shaft 19 for outputting motive power generated in the engine 17. A drive sprocket 20 is linked to the drive shaft 19. The clutch 13 switches between allowing and disallowing transmission of the motive power generated by the engine 17 to the drive shaft 19.

A swing arm 21 is swingingly supported at the lower rear of the main frame 2. At a rear end of the swing arm 21, a driven sprocket 22 and a rear wheel 23 are rotatably supported. A rear wheel brake 26 which is operated by a brake pedal (not shown) is provided on the rear wheel 23.

A chain 24 is suspended between the drive sprocket 20 and the driven sprocket 22. The motive power generated by the engine 17 is transmitted to the rear wheel 23 via the clutch 13, the transmission 18, the drive shaft 19, the drive sprocket 20, the chain 24, and the driven sprocket 22.

Below the seat 16, an ECU (Electronic Control Unit) 25 for controlling the operation of each section of the motorcycle 1 is provided. The brake pressure to the front wheel brake 10 and the rear wheel brake 26 is controlled by a brake modulator 38, in accordance with manipulation of the brake lever and the brake pedal.

On the main frame 2, a gyroscope 33, a lateral acceleration sensor 34, a vehicle speed acquisition circuit 45, and a bank angle acquisition circuit 46 are provided.

<2. Construction of the Longitudinal Force Control Apparatus>

Figure 2:
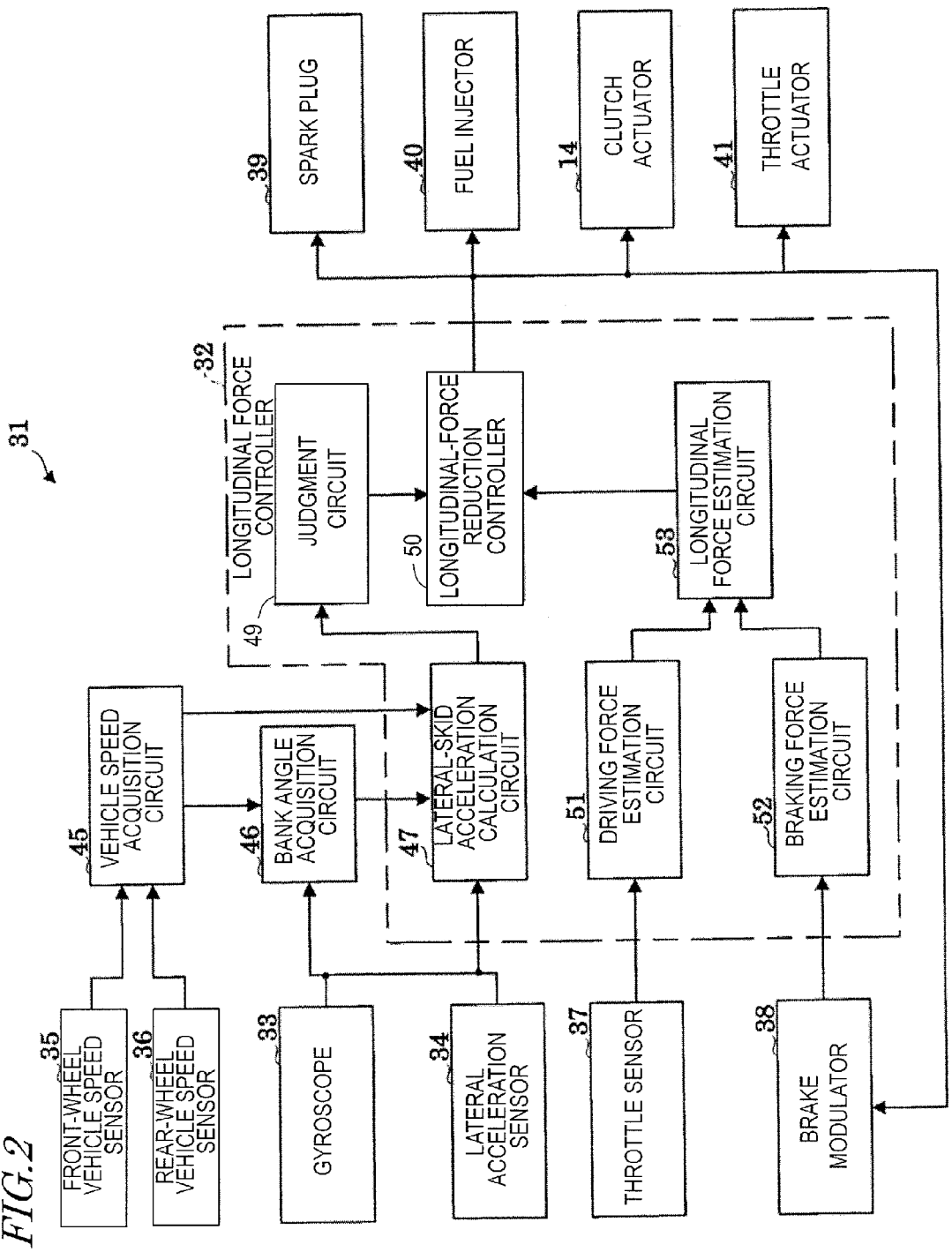
FIG. 2 is a functional block diagram schematically showing a longitudinal force control apparatus 31 included in a motorcycle 1.

Next, with reference to FIG. 1 and FIG. 2, the construction of a longitudinal force control apparatus 31 included in the motorcycle 1 according to the present embodiment will be described. FIG. 2 is a functional block diagram schematically showing the longitudinal force control apparatus 31.

As shown in FIG. 2, the longitudinal force control apparatus 31 includes a longitudinal force controller 32, the gyroscope 33, the lateral acceleration sensor 34, a front-wheel vehicle speed sensor 35, and a rear-wheel vehicle speed sensor 36. Moreover, the longitudinal force control apparatus 31 includes a throttle sensor 37, the brake modulator 38, the vehicle speed acquisition circuit 45, and the bank angle acquisition circuit 46. Note that some of the component elements of the longitudinal force control apparatus 31 may be included in the ECU 25 (that is, the ECU 25 may function as some of the component elements of the longitudinal force control apparatus 31). The longitudinal force controller 32 may be implemented as a known general-purpose digital signal processor or dedicated signal processing circuit. In some embodiments, the longitudinal force controller 32 may be a single processor. Such a single processor executes pre-loaded computer program to perform various processes; by performing the processes simultaneously or sequentially, the processor functions as different components; each function of the processor implemented by such a process is illustrated as a separate circuit in the longitudinal force controller 32 in the figures. The longitudinal force controller 32 may include integrated circuit devices and memories mounted on a substrate or substrates. Alternatively, the longitudinal force controller 32 may be part of a computer which has other functional blocks. What is important for the operation of the longitudinal force controller 32 is that it is constructed so as to execute the operations described herein, and the hardware of the longitudinal force controller 32 itself may be known to a person of ordinary skill in the art.

Likewise, other such circuits (e.g., vehicle speed acquisition circuit 45, and the bank angle acquisition circuit 46) may be constructed similarly to as described above with respect to the longitudinal force controller 32.

As will be described in detail later, at least with respect to the driving wheel (which herein is the rear wheel 23), the longitudinal force controller 32 is able to decrease the absolute value of a longitudinal force, which is a sum of forces along the front-rear direction acting on the wheel.

The gyroscope 33 detects angular velocities along the two axial directions of yaw and roll. In other words, the gyroscope 33 detects a yaw rate and a roll rate of the motorcycle 1. When a rider steers the handle bars 5 of the motorcycle 1 while curving, the yaw rate of the motorcycle 1 changes. Moreover, when the rider tilts the vehicle body of the motorcycle 1, the roll rate of the motorcycle 1 changes. Thus, the gyroscope 33 functions as a yaw rate sensor and roll rate sensor. The yaw rate and roll rate which are detected by the gyroscope 33 are output to the longitudinal force controller 32 and the bank angle acquisition circuit 46.

The lateral acceleration sensor 34 detects a lateral acceleration, which is an acceleration in the right-left direction (lateral direction) acting on the motorcycle 1. The right-left direction may be perpendicular to a forward direction of travel or a longitudinal direction. In other words, the lateral acceleration sensor 34 functions as a lateral acceleration acquisition section which acquires lateral acceleration. The lateral acceleration which is acquired (detected) by the lateral acceleration sensor 34 is output to the longitudinal force controller 32 and the bank angle acquisition circuit 46.

The front-wheel vehicle speed sensor 35 detects a rotation speed of the front wheel 8. The rear-wheel vehicle speed sensor 36 detects a rotation speed of the rear wheel 23. The rotation speeds of the front wheel 8 and the rear wheel 23 which are detected by the front-wheel vehicle speed sensor 35 and the rear-wheel vehicle speed sensor 36 are output to the vehicle speed acquisition circuit 45.

The throttle sensor 37 detects a position of the throttle. The throttle position which is detected by the throttle sensor 37 is output to the longitudinal force controller 32.

The brake modulator 38 detects brake pressures on the front wheel brake 10 and the rear wheel brake 26, and adjusts the respective brake pressures. The brake pressures detected by the brake modulator 38 are output to the longitudinal force controller 32.

<3. Construction of the Longitudinal Force Controller>

Next, the construction of the longitudinal force controller 32 will be described.

As shown in FIG. 2, inputs to the longitudinal force controller 32 are made from the gyroscope 33, the lateral acceleration sensor 34, the throttle sensor 37, the brake modulator 38, the vehicle speed acquisition circuit 45, and the bank angle acquisition circuit 46. Moreover, outputs from the longitudinal force controller 32 are made to the clutch actuator 14, the brake modulator 38, a spark plug 39, a fuel injector 40, and a throttle actuator 41.

In the exemplary construction illustrated in FIG. 2, the longitudinal force controller 32 includes a lateral-skid acceleration calculation circuit 47, a judgment circuit 49, a longitudinal-force reduction controller 50, a driving force estimation circuit 51, a braking force estimation circuit 52, and a longitudinal force estimation circuit 53. Based on the acquired lateral acceleration and bank angle, the longitudinal force controller 32 is able to decrease the absolute value of a longitudinal force at least with respect to the driving wheel. More specifically, the longitudinal force controller 32 determines whether or not a lateral skid is occurring at least with respect to the driving wheel, and if it is determined that a lateral skid is occurring, exerts a control to decrease the longitudinal force acting on that wheel.

<3.1. Lateral Skid Determination>

In order to determine whether a lateral skid is occurring or not, the longitudinal force controller 32 first calculates a lateral-skid acceleration with the lateral-skid acceleration calculation circuit 47, based on the velocity of travel, bank angle, lateral acceleration, and yaw rate of the motorcycle 1.

To the vehicle speed acquisition circuit 45, rotation speeds of the front wheel 8 and the rear wheel 23 are input from the front-wheel vehicle speed sensor 35 and the rear-wheel vehicle speed sensor 36. Based on the input rotation speeds of the front wheel 8 and the rear wheel 23, the vehicle speed acquisition circuit 45 acquires a velocity of travel (vehicle speed) of the motorcycle 1. The velocity of travel acquired by the vehicle speed acquisition circuit 45 is output to the bank angle acquisition circuit 46 and the lateral-skid acceleration calculation circuit 47.

To the bank angle acquisition circuit 46, the velocity of travel, yaw rate, and lateral acceleration of the motorcycle 1 are input respectively from the vehicle speed acquisition circuit 45, the gyroscope 33, and the lateral acceleration sensor 34. Based on the input velocity of travel, yaw rate, and lateral acceleration, the bank angle acquisition circuit 46 acquires a bank angle of the motorcycle 1. The bank angle acquired by the bank angle acquisition circuit 46 is output to the lateral-skid acceleration calculation circuit 47.

Figure 3:
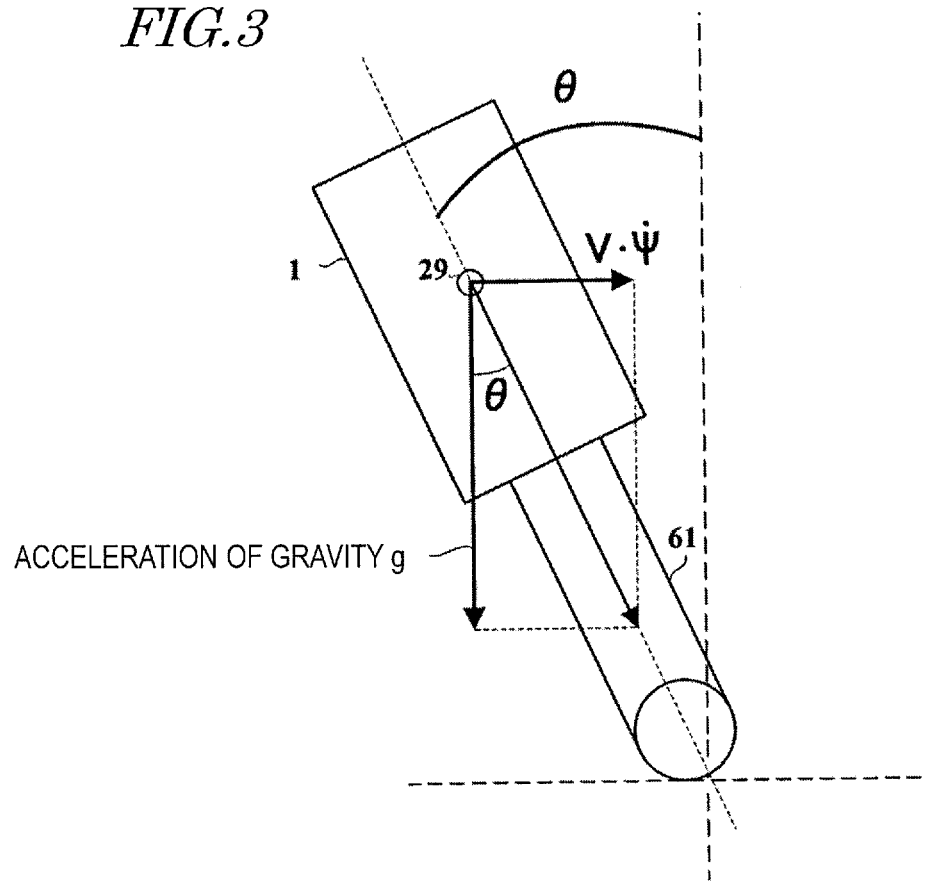
FIG. 3 is a diagram schematically showing an acceleration occurring at the barycenter 29 of the motorcycle 1.
Figure 4:
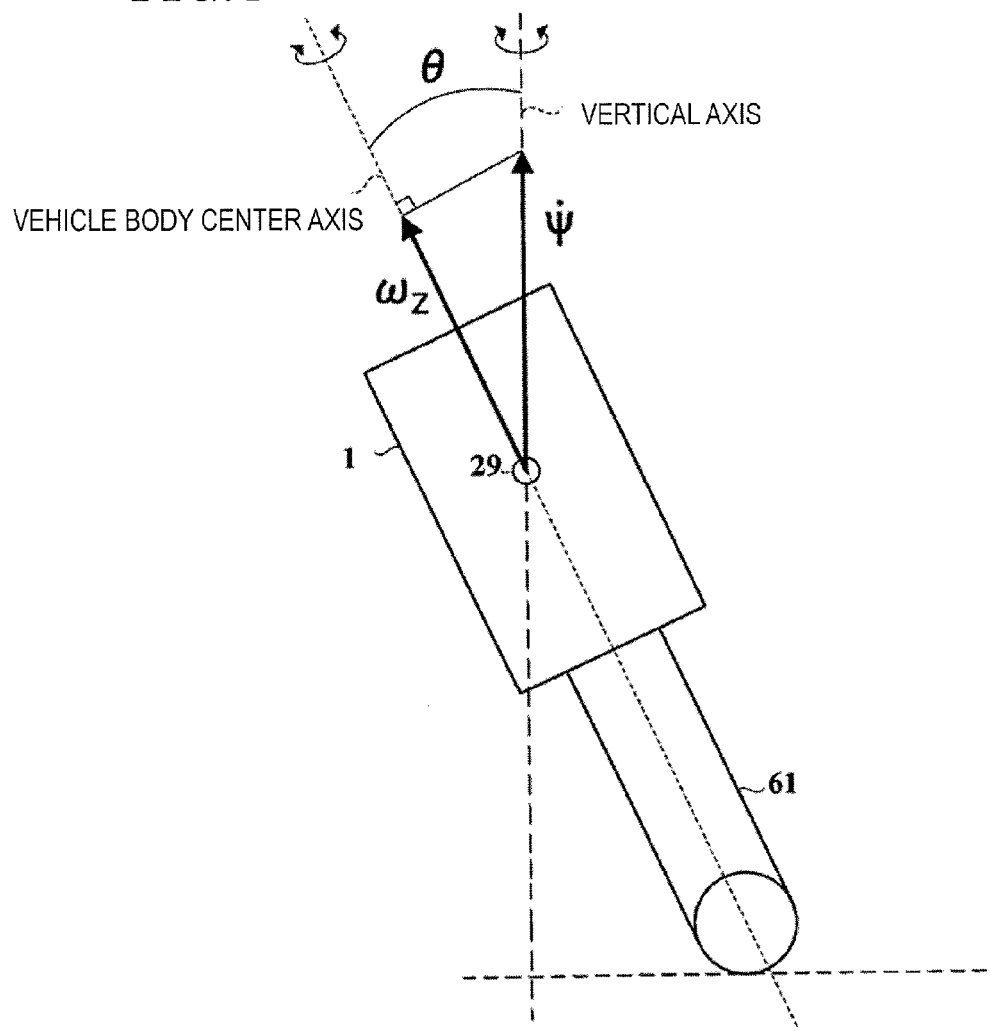
FIG. 4 is a diagram schematically showing an angular velocity occurring in the motorcycle 1.

Now, a bank angle calculation method will be described with reference to FIG. 3 and FIG. 4. FIG. 3 is a diagram schematically showing an acceleration occurring at the barycenter 29 of the motorcycle 1. FIG. 4 is a diagram schematically showing an angular velocity occurring in the motorcycle 1. Note that the calculation method described herein is a calculation method in an ideal state of turning at a velocity V while ignoring the pitching of the vehicle body and the tire thickness, under a lean-with state. A lean-with state is a state where the upper body of the rider and the vehicle body center axis, which extends along the top-bottom direction of the vehicle body, are on the same line.

As can be seen from FIG. 3, the relationship between the bank angle θ, the velocity of travel V, a time derivative dψ/dt (i.e., the yaw rate) of yaw angle ψ, and the acceleration of gravity g during turning is expressed by eq. (1) below.

$$\theta = \arctan(V \cdot (d\psi/dt)/g) \quad (1)$$

Moreover, as can be seen from FIG. 4, the relationship between the bank angle θ, the output value $\omega_z$ of the yaw rate sensor (gyroscope 33), and a time derivative dψ/dt of the yaw angle ψ during turning is expressed by eq. (2) below. Herein, the output value $\omega_z$ of the yaw rate sensor is an angular velocity occurring around the vehicle body center axis, and the time derivative dψ/dt of the yaw angle ψ is an angular velocity occurring around the vertical axis.

$$\theta = \arccos(\omega_z/(d\psi/dt)) \quad (2)$$

From eq. (1) and eq. (2) above, the following eq. (3) is derived. It can be seen from eq. (3) that the bank angle θ can be calculated based on the output value $\omega_z$ of the yaw rate sensor and the velocity of travel V.

$$\theta = \arcsin(V \cdot \omega_z/g) \quad (3)$$

To the lateral-skid acceleration calculation circuit 47, the velocity of travel, bank angle, yaw rate, and lateral acceleration are input from the vehicle speed acquisition circuit 45, the bank angle acquisition circuit 46, the gyroscope 33, and the lateral acceleration sensor 34. Based on the input velocity of travel, bank angle, yaw rate, and lateral acceleration, the lateral-skid acceleration calculation circuit 47 calculates a lateral-skid acceleration at least with respect to the driving wheel. The lateral-skid acceleration calculated by the lateral-skid acceleration calculation circuit 47 is output to the judgment circuit 49.

The lateral-skid acceleration dfy/dt of the front wheel 8 is calculated from eq. (4) below, for example. Moreover, the lateral-skid acceleration dry/dt of the rear wheel 23 is calculated from eq. (5) below, for example. In eq. (4) and (5), Ay represents an output value of the lateral acceleration sensor 34. In eq. (4), If represents a horizontal distance between the position at which the lateral acceleration sensor 34 is attached and the center of the front wheel 8 (see FIG. 1); and Ir in eq. (5) represents a horizontal distance between the position at which the lateral acceleration sensor 34 is attached and the center of the rear wheel 23 (see FIG. 1).

$$dfy/dt = -V \cdot \omega_z \cdot \sec\theta - g \cdot \tan\theta + Ay \cdot \sec\theta + If \cdot d\omega_z/dt \cdot \sec\theta \quad (4)$$

$$dry/dt = -V \cdot \omega_z \cdot \sec\theta - g \cdot \tan\theta + Ay \cdot \sec\theta - Ir \cdot d\omega_z/dt \cdot \sec\theta \quad (5)$$

In the case where the roll rate is also relied on in calculating the lateral-skid acceleration, the lateral-skid acceleration dfy/dt of the front wheel 8 and the lateral-skid acceleration dry/dt of the rear wheel 23 are respectively calculated from eq. (6) and (7) below. In eqs. (6) and (7), wr represents an output value of the roll rate sensor.

$$dfy/dt = -V \cdot \omega_z \cdot \sec\theta - g \cdot \tan\theta + Ay \cdot \sec\theta + If \cdot d\omega_z/dt \cdot \sec\theta + If \cdot wr \cdot \omega_z \cdot \tan\theta \cdot \sec\theta \quad (6)$$

$$dry/dt = -V \cdot \omega_z \cdot \sec\theta - g \cdot \tan\theta + Ay \cdot \sec\theta - Ir \cdot d\omega_z/dt \cdot \sec\theta - Ir \cdot wr \cdot \omega_z \cdot \tan\theta \cdot \sec\theta \quad (7)$$

The judgment circuit 49 determines whether the calculated lateral-skid acceleration is equal to or greater than a predetermined threshold $G_{TH}$. If the lateral-skid acceleration of a given wheel is equal to or greater than the threshold $G_{TH}$, the judgment circuit 49 determines that a lateral skid is occurring in that wheel, and outputs a longitudinal-force reduction control signal to the longitudinal-force reduction controller 50 for decreasing the longitudinal force acting on that wheel. Note that the threshold $G_{TH}$ may be set to different values between the front wheel 8 and the rear wheel 23.

Figure 5:
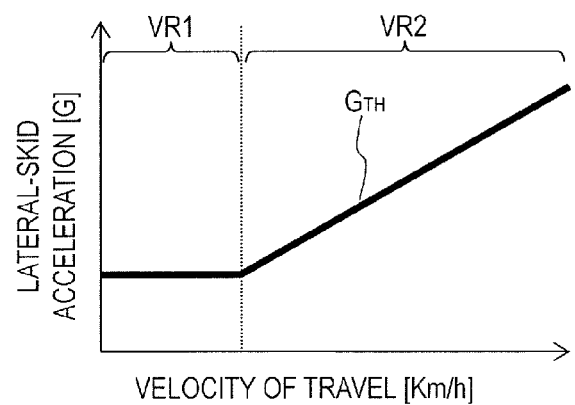
FIG. 5 is a diagram showing an example of a threshold $G_{TH}$ which is used for judgment by a judgment circuit 49 included in the longitudinal force control apparatus 31.

An example of a threshold $G_{TH}$ used for the judgment by the judgment circuit 49 is shown in FIG. 5. As shown in FIG. 5, the threshold $G_{TH}$ is greater in a relatively higher velocity range (hereinafter referred to as the "second velocity range") VR2 than in a relatively lower velocity range (hereinafter referred to as the "first velocity range") VR1 of the velocity of travel of the motorcycle 1.

In the example shown in FIG. 5, the threshold $G_{TH}$ is substantially constant in the first velocity range VR1. In the second velocity range VR2, the threshold $G_{TH}$ becomes greater as the velocity of travel increases.

<3.2. Longitudinal Force Estimation and Longitudinal-Force Reduction>

A throttle position is input from the throttle sensor 37 to the driving force estimation circuit 51. Based on the input throttle position, the driving force estimation circuit 51 estimates a driving force acting on the driving wheel. In the present embodiment, since the rear wheel 23 is the driving wheel, no driving force is acting on the front wheel 8. The driving force of the rear wheel 23 estimated by the driving force estimation circuit 51 is output to the longitudinal force estimation circuit 53.

A brake pressure is input from the brake modulator 38 to the braking force estimation circuit 52. Based on the input brake pressure, the braking force estimation circuit 52 estimates a braking force acting at least on the driving wheel. The braking force estimated by the braking force estimation circuit 52 is output to the longitudinal force estimation circuit 53.

Based on the input driving force and braking force, the longitudinal force estimation circuit 53 estimates a longitudinal force a sum of the driving force and the braking force) acting at least on the driving wheel. The longitudinal force estimated by the longitudinal force estimation circuit 53 is output to the longitudinal-force reduction controller 50.

To the longitudinal-force reduction controller 50, a longitudinal-force reduction control signal is input from the judgment circuit 49, and also a longitudinal force is input from the longitudinal force estimation circuit 53. Based on the input longitudinal-force reduction control signal and longitudinal force, the longitudinal-force reduction controller 50 exerts a control to decrease the absolute value of the longitudinal force acting at least on the driving wheel. Specifically, if the driving force is greater than the braking force, the longitudinal-force reduction controller 50 decreases the driving force or increases the braking force, or performs both. On the other hand, if the braking force is greater than the driving force, the longitudinal-force reduction controller 50 decreases the braking force or increases the driving force, or performs both.

Figure 6A:
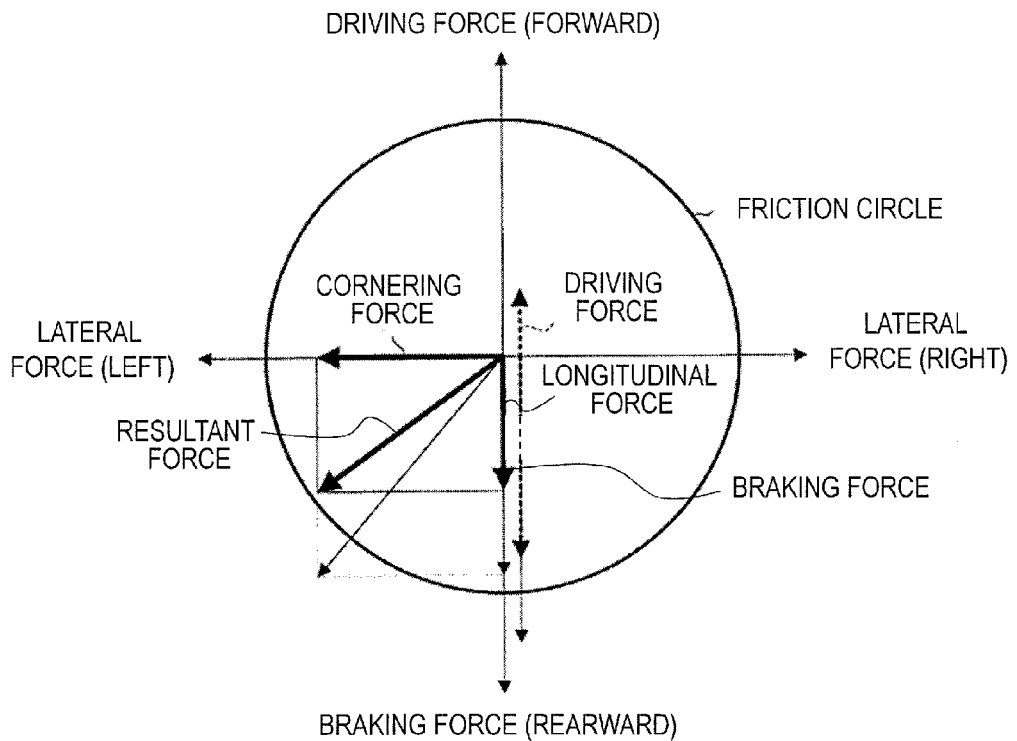
FIGS. 6A and 6B are diagrams showing a relationship between forces acting on a wheel and a friction circle.
Figure 6B:
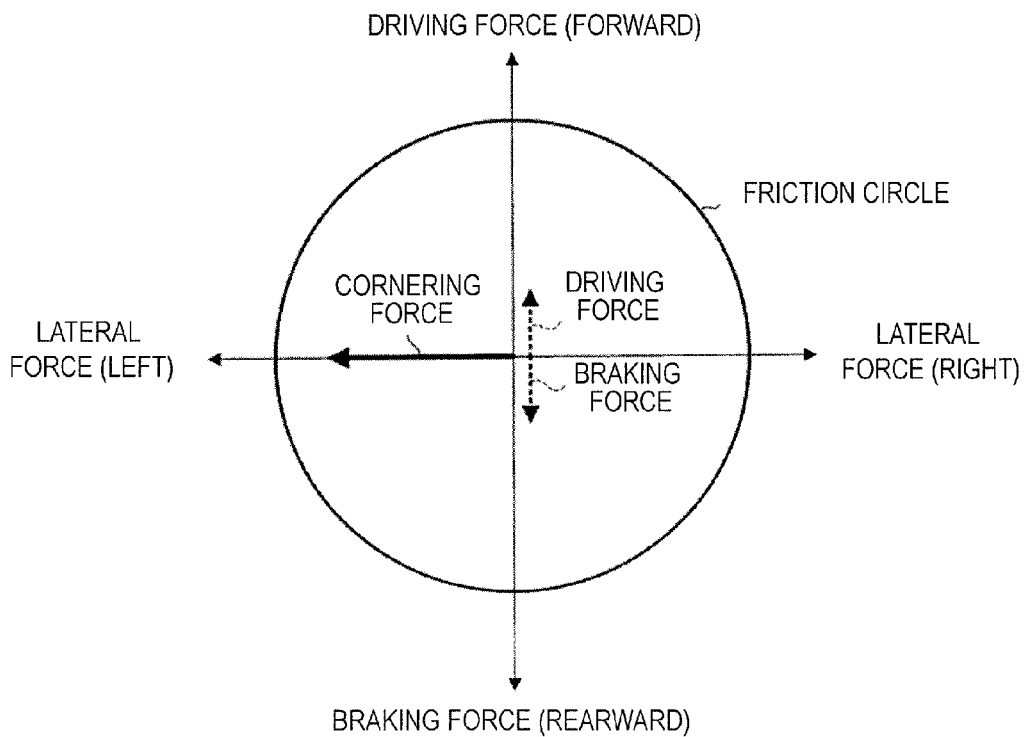
Figure 16:
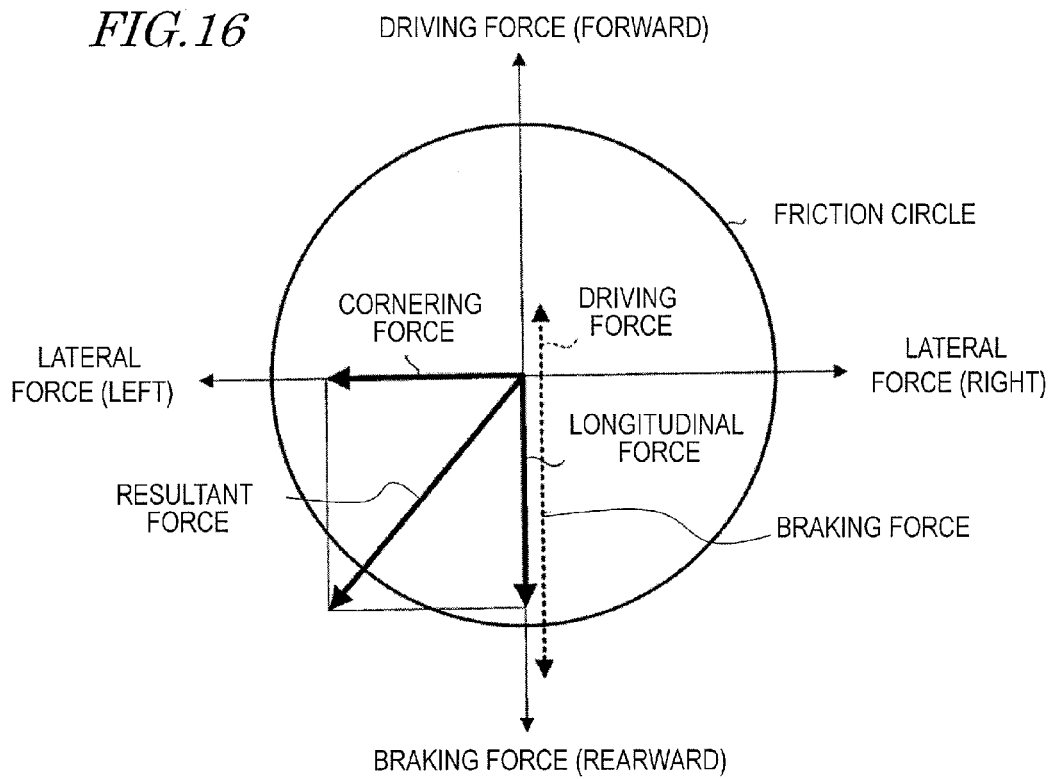
FIG. 16 is a diagram showing a relationship between forces acting on a wheel and a friction circle.
Figure 17:
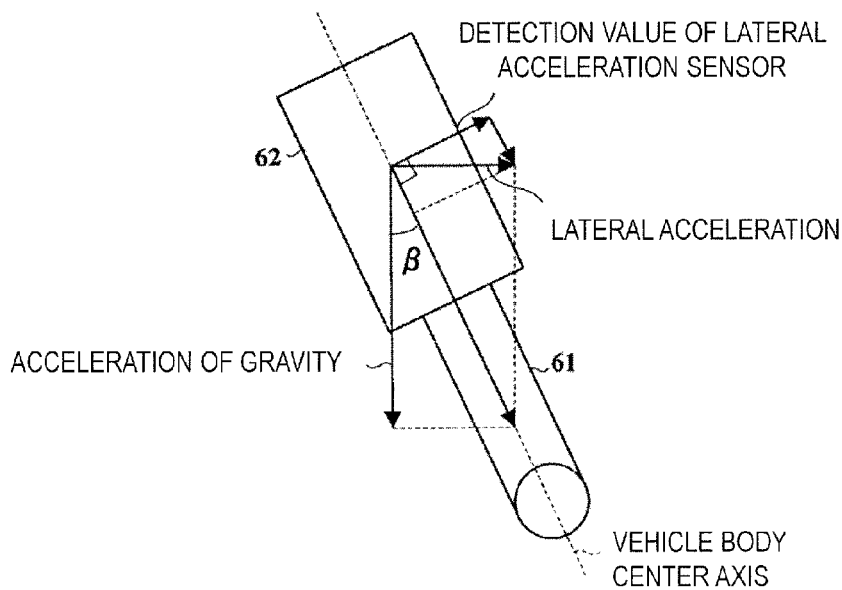
FIG. 17 is a diagram showing a detection value of a lateral acceleration sensor in the apparatus of Patent Document 1.

For example, if a lateral skid is occurring as illustrated in FIG. 16, the longitudinal force as a sum of the driving force and the braking force can be reduced by decreasing the braking force, as shown in FIG. 6A. As a result, the resultant force of the cornering force (lateral force) and the longitudinal force fits in the friction circle, whereby lateral skidding can be stopped. Moreover, as shown in FIG. 6B, control may be exerted to equalize the driving force and the braking force in magnitude, so that the longitudinal force becomes zero, thus allowing the entire range of the friction circle to be allocated to the lateral force. Thus, a maximum allowance can be given as to cornering force.

When decreasing the driving force to reduce the longitudinal force, the longitudinal-force reduction controller 50 may control the spark plug 39 to reduce the ignition frequency, or control the spark plug 39 to lag the ignition timing, for example. Alternatively, the longitudinal-force reduction controller 50 may control the fuel injector 40 to decrease the injected amount of fuel, thereby decreasing the driving force. Alternatively, the longitudinal-force reduction controller 50 may control the clutch actuator 14 to decrease the transmission torque of the clutch 13, thereby decreasing the driving force.

When increasing the driving force to reduce the longitudinal force, the longitudinal-force reduction controller 50 may control the fuel injector 40 to increase the injected amount of fuel, for example. In the case where the motorcycle 1 includes an electronic throttle, the longitudinal-force reduction controller 50 may exert a control to increase the throttle position, thereby increasing the driving force.

When decreasing or increasing the braking force to reduce the longitudinal force, the longitudinal-force reduction controller 50 controls the brake modulator 38 to decrease or increase brake pressure, for example. Alternatively, the longitudinal-force reduction controller 50 may exert a control to decrease the throttle position to activate engine braking, thereby increasing the braking force. When engine braking is already activated, the longitudinal-force reduction controller 50 may conversely exert a control to increase the throttle position to reduce the action of engine braking, thereby decreasing the braking force. The amounts by which to decrease or increase the driving force and the braking force are to be adjusted in accordance with the magnitude of the longitudinal force which is output from the longitudinal force estimation circuit 53 and input to the longitudinal-force reduction controller 50.

Thus, when a lateral skid occurs in a wheel, the longitudinal force as a resultant force of the driving force and the braking force can be reduced to give an increased allowance as to gripping force in the lateral direction. As a result, the attitude of the motorcycle 1 can be appropriately controlled even during curving.

<4. Longitudinal-Force Reduction Control Operation>

Figure 7:
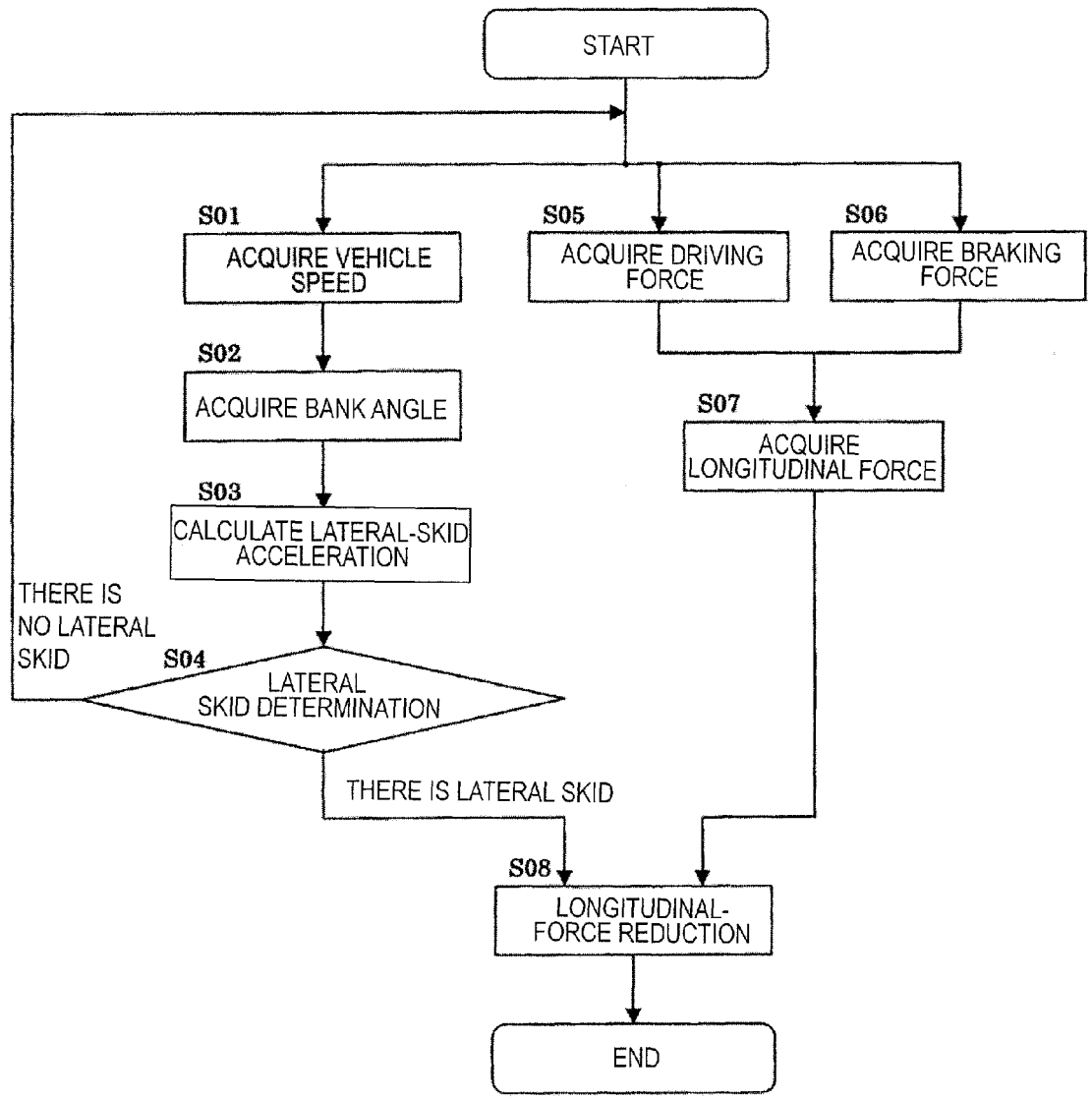
FIG. 7 is a flowchart showing a control operation of a longitudinal force controller 32.

Next, with reference to FIG. 7, a control operation of the longitudinal force controller 32 will be described. FIG. 7 is a flowchart of the longitudinal force control operation.

When the motorcycle 1 is at a curve, the rider banks the vehicle body of the motorcycle 1. The front-wheel vehicle speed sensor 35 and the rear-wheel vehicle speed sensor 36 are incessantly detecting the rotation speeds of the front wheel 8 and the rear wheel 23, and based on the detected rotation speeds of the front wheel 8 and the rear wheel 23, the vehicle speed acquisition circuit 45 acquires a velocity of travel (vehicle speed) of the motorcycle 1 (step S01).

Next, based on the acquired vehicle speed, the yaw rate detected by the gyroscope 33, and the lateral acceleration detected by the lateral acceleration sensor 34, the bank angle acquisition circuit 46 acquires a bank angle of the motorcycle 1 (step S02).

Then, based on the acquired bank angle, vehicle speed, yaw rate, and lateral acceleration, the lateral-skid acceleration calculation circuit 47 calculates a lateral-skid acceleration at least with respect to the driving wheel (step S03).

Thereafter, the judgment circuit 49 determines whether or not the calculated lateral-skid acceleration is equal to or greater than the threshold $G_{TH}$ (lateral skid determination) (step S04). If the absolute value of a lateral-skid acceleration of a given wheel is equal to or greater than the threshold $G_{TH}$, it is determined that a lateral skid is occurring in that wheel. On the other hand, if the absolute value of a lateral-skid acceleration of a given wheel is less than the threshold $G_{TH}$, it is determined that no lateral skid is occurring in that wheel, and again various state functions of the motorcycle 1 are detected or acquired.

Concurrently with steps S01 to S04 described above, a driving force acting on the driving wheel is estimated, thereby acquiring a driving force (step S05). Driving force estimation may be conducted by the driving force estimation circuit 51 based on a throttle position which is detected by the throttle sensor 37, for example.

Moreover, concurrently with steps S01 to S05, a braking force acting on each wheel is estimated, thereby acquiring a braking force (step S06). Braking force estimation may be conducted by the braking force estimation circuit 52, based on a brake pressure which is detected by the brake modulator 38, for example.

Next, based on the acquired driving force and braking force, a longitudinal force acting on each wheel is estimated, thereby acquiring a longitudinal force (step S07). Longitudinal force estimation can be subtracting the braking force from the driving force at the longitudinal force estimation circuit 53, for example.

If it is determined through lateral skid determination (S04) that a lateral skid is occurring in at least one wheel, the longitudinal force occurring in that wheel is reduced (step S08). Reduction of longitudinal force is made through a control which is exerted by the longitudinal-force reduction controller 50 based on the magnitude of the longitudinal force input from the longitudinal force estimation circuit 53 that is determined at step S07. Specifically, the longitudinal-force reduction controller 50 increases or decreases the driving force and/or increases or decreases the braking force in accordance with the magnitudes of the driving force and the braking force relative to each other. An increase in the driving force may be made by increasing the amount of fuel which is injected from the fuel injector 40, for example. A decrease in the driving force may be made by decreasing the amount of fuel which is injected from the fuel injector 40, decreasing the ignition frequency by the spark plug 39, or lagging the ignition timing, for example. Alternatively, a decrease in the driving force may be made by decreasing the transmission torque of the clutch 13 at the clutch actuator 14. Moreover, an increase or decrease in the braking force may be made by increasing or decreasing the brake pressure with the brake modulator 38, for example.

Figure 8:
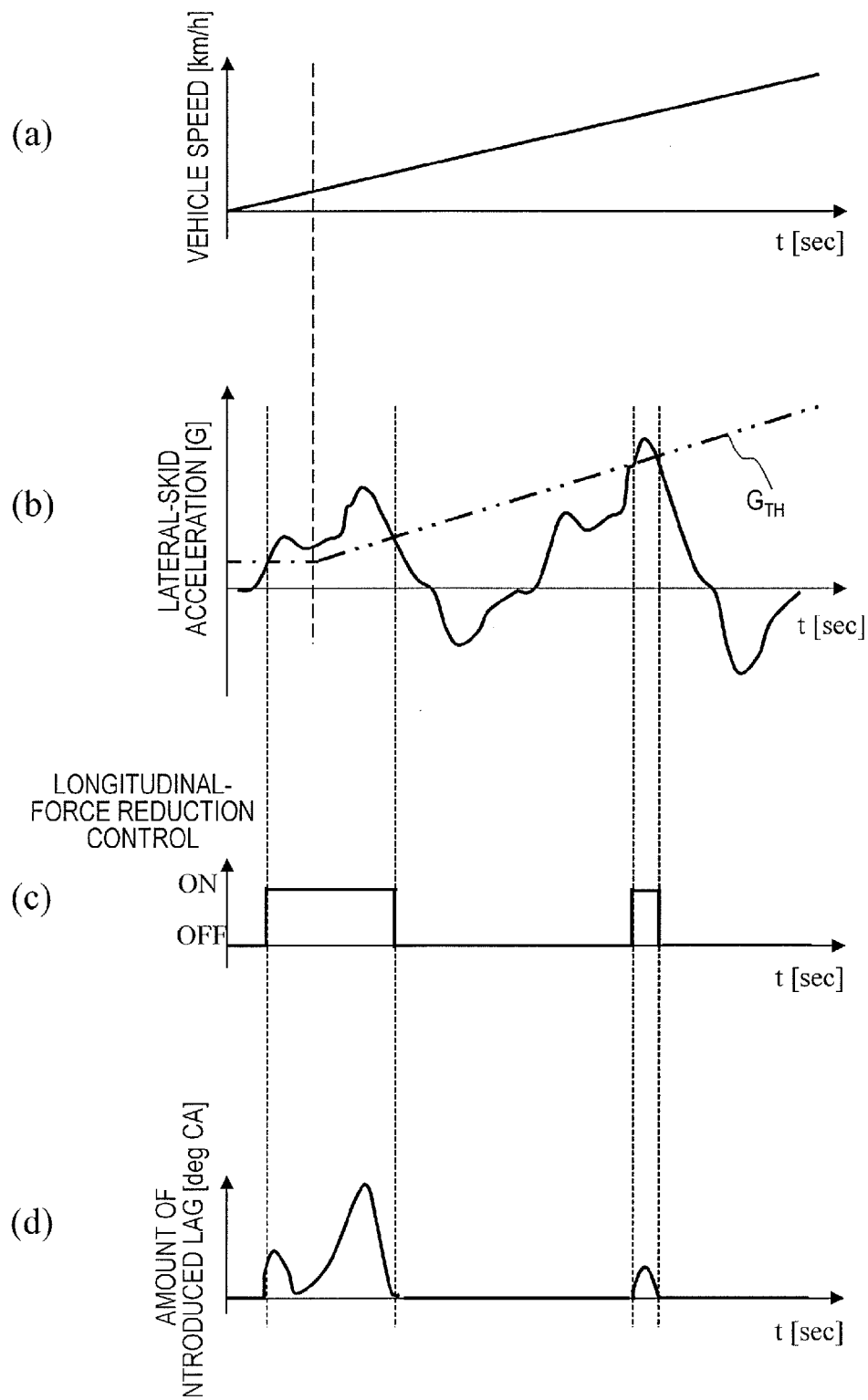
FIG. 8 includes: (a) a diagram showing a relationship between vehicle speed (km/h) and time t (sec); and (b), (c), and (d), which are diagrams showing a relationship between lateral-skid acceleration (G), ON/OFF of longitudinal-force reduction control, and amounts of introduced lag in ignition timing (degCA) versus time t (sec) when vehicle speed varies in a manner shown in (a).

Now, with reference to FIG. 8, a more specific example of control by the longitudinal force control apparatus 31 will be described. FIG. 8(a) shows a relationship between vehicle speed (km/h) and time t (sec). In the example described here, vehicle speed monotonously increases with time, as shown in FIG. 8(a). In FIGS. 8, (b), (c), and (d) are diagrams showing a relationship between lateral-skid acceleration (G), ON/OFF of longitudinal-force reduction control, and amounts of introduced lag in ignition timing (degCA) versus time t (sec) when vehicle speed varies in a manner shown in FIG. 8(a).

As can be seen from (a) to (d) of FIG. 8, when the lateral-skid acceleration become equal to or greater than the threshold (intervention threshold) $G_{TH}$, longitudinal-force reduction control will be turned ON. The amount of introduced lag when longitudinal force control is exerted is determined in accordance with the difference between the lateral-skid acceleration and the intervention threshold $G_{TH}$, and/or an amount of change of the lateral-skid acceleration per unit time, for example. As the determined amount of introduced lag is reflected by the engine control, the driving force is decreased.

As described above, according to an embodiment of the present invention, the longitudinal force controller 32 decreases the absolute value of the longitudinal force based on the lateral acceleration acquired by the lateral acceleration sensor (lateral acceleration acquisition section) 34 and the bank angle acquired by the bank angle acquisition circuit 46; therefore, it is possible to exert longitudinal force control with a high accuracy, irrespective of the bank angle of the vehicle. Moreover, according to an embodiment of the present invention, the longitudinal force controller 32 includes the lateral-skid acceleration calculation circuit 47, which at least calculates a lateral-skid acceleration of the driving wheel, and the judgment circuit 49, which determines whether the calculated lateral-skid acceleration exceeds the predetermined threshold $G_{TH}$ or not; therefore, it is possible to exert a longitudinal force control in accordance with the lateral-skid acceleration of the wheel (at least the driving wheel), thus suitably stopping lateral skidding.

Furthermore, according to an embodiment of the present invention, the threshold (intervention threshold) $G_{TH}$ used for the judgment by the judgment circuit 49 is greater when the velocity of travel of the vehicle is in a relatively higher velocity range (second velocity range) VR2 than in a relatively lower velocity range (first velocity range) VR1. That is, the longitudinal force controller 32 determines several different velocity ranges (e.g., VR1 and VR2), and adjusts $G_{TH}$ in each of the different velocity ranges. The adjustment of $G_{th}$ may be different in each velocity range. Thus, as will be specifically described later, it is possible to prevent unwanted intervention of longitudinal force control in a high-speed range, and prevent failure to exert longitudinal force control in situations where longitudinal force control is needed in a low-speed range.

Figure 9:
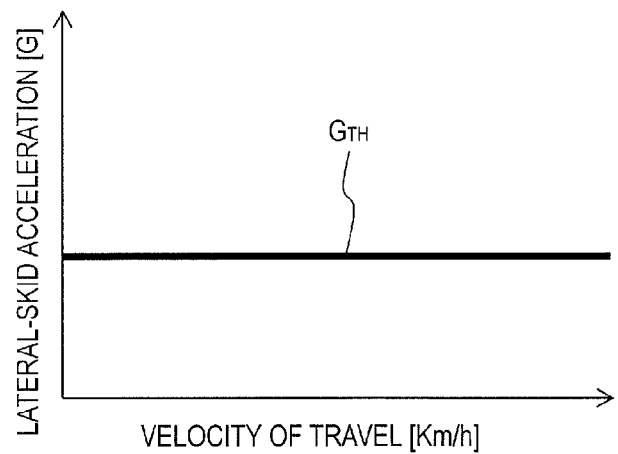
FIG. 9 is a diagram showing an example of a threshold $G_{TH}$ which is constant regardless of velocity of travel.

On the other hand, if the intervention threshold $G_{TH}$ is constant irrespective of the velocity of travel of the motorcycle (vehicle) 1, as shown in FIG. 9, there occurs the problems of unwanted intervention of longitudinal force control in a high-speed range and failure to exert longitudinal force control in situations where longitudinal force control is needed in a low-speed range. Hereinafter, these problems will be described more specifically.

Through studies of the inventors, it has been found that the lateral-skid acceleration that is tolerated by a rider differs depending on the velocity of travel. Specifically, it has been found that greater lateral-skid acceleration is tolerated as the velocity of travel increases. Therefore, when the intervention threshold $G_{TH}$ is constant irrespective of the velocity of travel, problems illustrated in FIG. 10 will occur.

Figure 10:
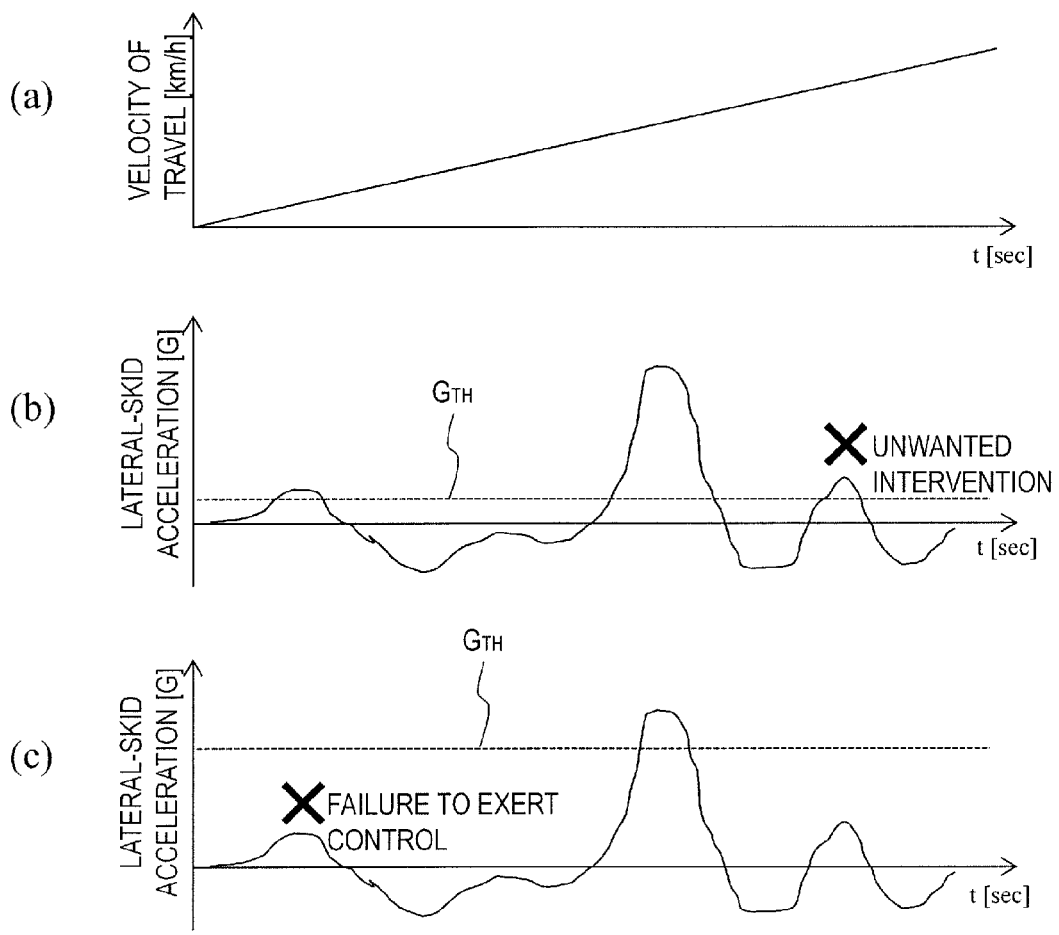
FIG. 10 includes: (a) a relationship between velocity of travel (km/h) and time t (sec); and (b) and (c), which are diagrams showing a relationship between lateral-skid acceleration (G) and time t (sec) when velocity of travel varies in a manner shown in (a).

FIG. 10(a) shows a relationship between velocity of travel (km/h) and time t (sec), where velocity of travel monotonously increases with lapse of time. In FIGS. 10, (b) and (c) show a relationship between lateral-skid acceleration (G) and time t (sec) when velocity of travel varies in a manner shown in FIG. 10(a).

When the intervention threshold $G_{TH}$ is set rather low, as shown in FIG. 10(b), unwanted intervention of longitudinal force control may occur in a high-speed range. On the other hand, if the intervention threshold $G_{TH}$ is set rather high, as shown in FIG. 10(c), longitudinal force control may not be exerted in situations where longitudinal force control is needed in a low-speed range. Thus, if the intervention threshold $G_{TH}$ is constant irrespective of the velocity of travel of the motorcycle (vehicle) 1, problems such as unwanted intervention of longitudinal force control and failure to exert longitudinal force control may occur.

On the other hand, in the longitudinal force control apparatus 31 according to an embodiment of the present invention, the intervention threshold $G_{TH}$ is greater in the second velocity range VR2 than in the first velocity range VR1. Therefore, as can be seen from (a) and (b) of FIG. 11, it is possible to prevent unwanted intervention of longitudinal force control in a high-speed range, and prevent failure to exert longitudinal force control in situations where longitudinal force control is needed in a low-speed range. Thus, the longitudinal force control apparatus 31 according to an embodiment of the present invention can suitably exert longitudinal force control at the timing needed by the rider.

Note that, in order to prevent the aforementioned problems, it might be conceivable to use a technique which is proposed in Japanese National Phase PCT Laid-Open Publication No.

2013-523532. In the technique described in Japanese National Phase PCT Laid-Open Publication No. 2013-523532, a variable which describes oversteering of a motorcycle is detected as an adjustment variable, and when the adjustment variable exceeds the predetermined threshold, a control is exerted to stabilize the motorcycle.

Japanese National Phase PCT Laid-Open Publication No. 2013-523532 discloses use of a lateral skid angle β or a time derivative d β/dt thereof as the aforementioned adjustment variable. Since the lateral skid angle β is a parameter which takes into account the vehicle velocity Vx (i.e., it is a parameter which varies with the vehicle velocity Vx), use of the technique of Japanese National Phase PCT Laid-Open Publication No. 2013-523532 might appear to prevent the aforementioned problems.

Figure 12:
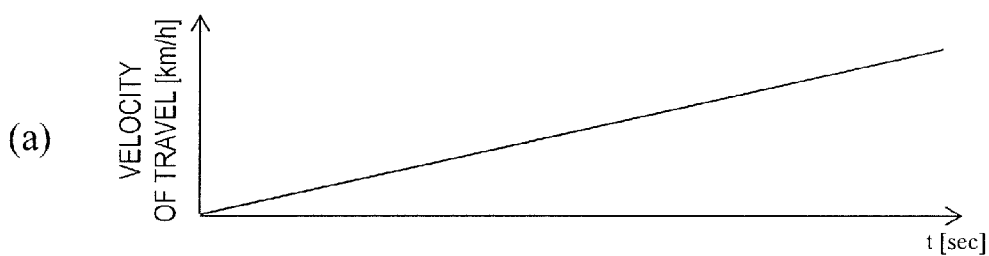
FIG. 12 includes: (a) a diagram showing a relationship between velocity of travel (km/h) and time t (sec); and (b) a diagram showing a relationship between lateral skid angle β (rad) and time t (sec) when vehicle speed varies in a manner shown in (a).
Figure 12:
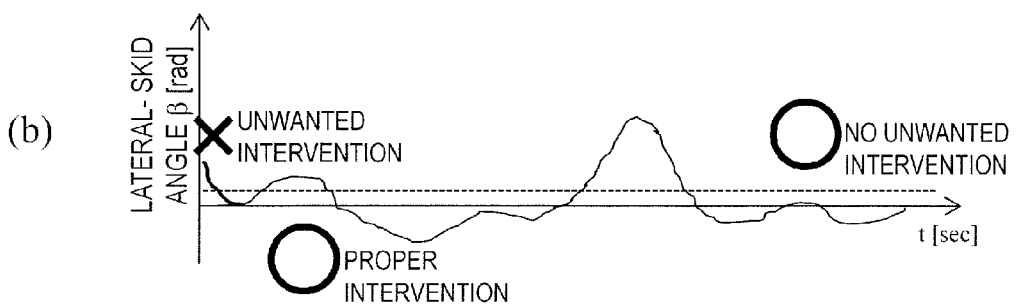

However, since the lateral skid angle β is a parameter to be derived through a calculation which involves the vehicle velocity Vx as a divisor, it will take large values in a low-speed range (or more specifically, a very-low-speed range), as will be seen from (a) and (b) of FIG. 12. This may result in unwanted intervention of longitudinal force control.

Figure 11:
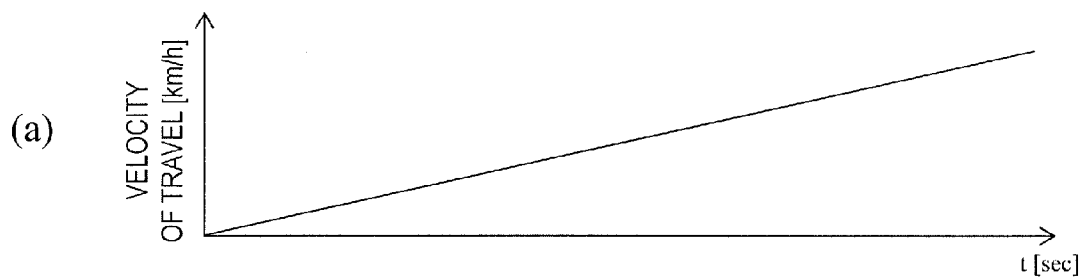
FIG. 11 includes: (a) a diagram showing a relationship between velocity of travel (km/h) and time t (sec); and (b) a diagram showing a relationship between lateral-skid acceleration (G) and time t (sec) when vehicle speed varies in a manner shown in (a).
Figure 11:
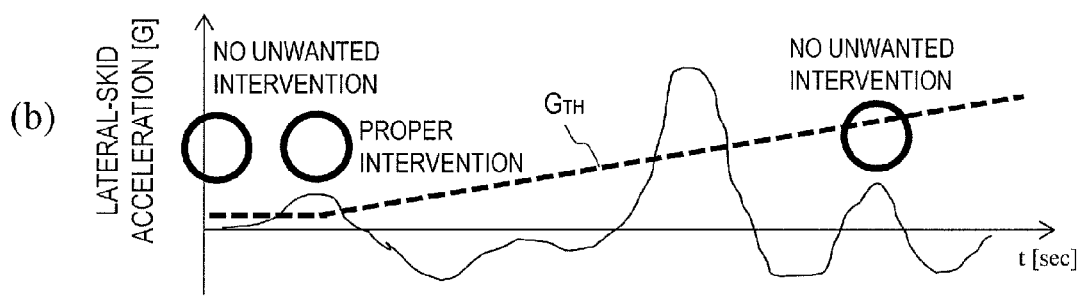

On the other hand, in the present embodiment, where the intervention threshold $G_{TH}$ is set so as to be substantially constant in the first velocity range VR1, unwanted intervention of longitudinal force control in a low-speed range (or more specifically, a very-low-speed range) can be prevented (see FIGS. 11, (a) and (b)). Note that the intervention threshold $G_{TH}$ does not need to be strictly constant in the first velocity range VR1. The aforementioned effect can be obtained so long as it is substantially constant (e.g., within a ±50% range of an average value in the first velocity range VR1). Although there is no particular limitation as to the specific value of the intervention threshold $G_{TH}$ in the first velocity range VR1, from the standpoint of preventing unwanted intervention of longitudinal force control in a low-speed range (very-low-speed range) with greater certainty, it is preferable that the intervention threshold $G_{TH}$ in the first velocity range VR1 is 0.1 G or more, for example.

Moreover, when the intervention threshold $G_{TH}$ is set so as to increase as the velocity of travel increases in the second velocity range VR2 as in the present embodiment, unwanted intervention of longitudinal force control in a high-speed range can be prevented with greater certainty.

Note that there is no particular limitation as to the specific ranges of the first velocity range VR1 and the second velocity range VR2. Typically, the beginning of the first velocity range VR1 is 0 km/h. Moreover, the end of the first velocity range VR1 (which may also be considered as the beginning of the second velocity range VR2) is preferably 10 km/h or more.

Moreover, in the present embodiment, where the longitudinal force controller 32 is able to decrease the absolute value of the longitudinal force based not only on the lateral acceleration and bank angle, but also on the yaw rate and velocity of travel, it is possible to exert longitudinal force control with a higher accuracy. Furthermore, when the longitudinal force controller 32 is able to decrease the absolute value of the longitudinal force based also on the roll rate in addition to the lateral acceleration, bank angle, yaw rate, and velocity of travel, it is possible to exert longitudinal force control with an even higher accuracy.

Moreover, it is preferable that, as in the present embodiment, the lateral-skid acceleration calculation circuit 47 calculates a lateral-skid acceleration based not only on the lateral acceleration and bank angle, but also on the yaw rate and velocity of travel.

The longitudinal force controller 32 preferably changes the decrease in the absolute value of the longitudinal force in accordance with the magnitude of the lateral-skid acceleration. By changing the decrease in the absolute value of the longitudinal force in accordance with the magnitude of the lateral-skid acceleration, an appropriate longitudinal force control can be exerted.

Alternatively, it is also preferable for the longitudinal force controller 32 to change the decrease in the absolute value of the longitudinal force in accordance with a difference between the lateral-skid acceleration and the threshold $G_{TH}$ and/or an amount of change of the lateral-skid acceleration per unit time. An appropriate longitudinal force control can also be exerted by changing the decrease in the absolute value of the longitudinal force in accordance with a difference between the lateral-skid acceleration and the threshold $G_{TH}$ and/or an amount of change of the lateral-skid acceleration per unit time.

The relationship between the intervention threshold $G_{TH}$ and the velocity of travel is not limited to that which is exemplified in FIG. 5. For example, the intervention threshold $G_{TH}$ may be set as shown in FIG. 13.

Figure 13:
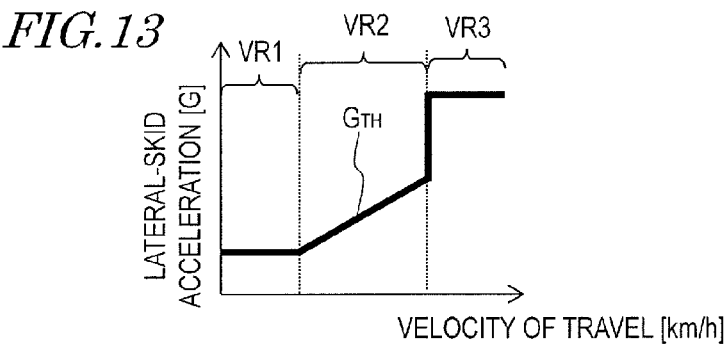
FIG. 13 is a diagram showing another example a threshold $G_{TH}$ which is used for judgment by the judgment circuit 49 included in the longitudinal force control apparatus 31.

In the example shown in FIG. 13, the intervention threshold $G_{TH}$ is set so that reduction of the longitudinal force by the longitudinal force controller 32 is substantially not performed in a velocity range (third velocity range) VR3 which is further to the higher-speed side of the second velocity range VR2. In other words, the intervention threshold $G_{TH}$ is set so as to be a sufficiently greater value (e.g., 5 G or more) than the expected lateral-skid acceleration in the third velocity range VR3. The beginning of the third velocity range VR3 (which may also be considered as the end of the second velocity range VR2) is 200 km/h or more, for example.

When the intervention threshold $G_{TH}$ is set so that reduction of the longitudinal force by the longitudinal force controller 32 is substantially not performed in the third velocity range VR3 as shown in FIG. 13, it can be ensured that longitudinal force control is not exerted in a velocity range where turning motions are unlikely to be made. This can prevent unwanted interventions associated with vehicle body vibration or the like during a travel at a high speed.

Figure 14:
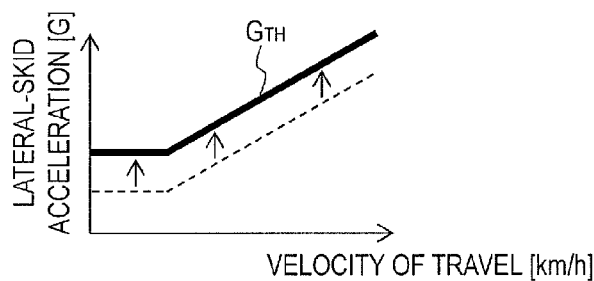
FIG. 14 is a diagram showing still another example of a threshold $G_{TH}$ which is used for judgment by the judgment circuit 49 included in the longitudinal force control apparatus 31.
Figure 15:
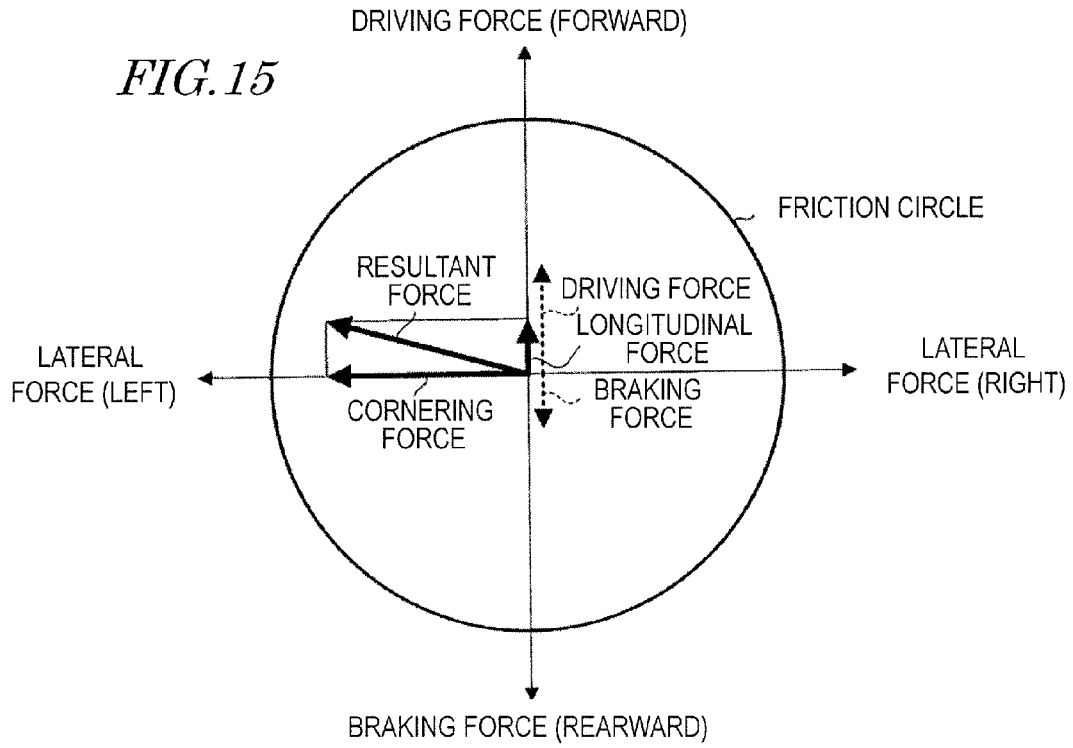
FIG. 15 is a diagram showing a relationship between forces acting on a wheel and a friction circle.

Moreover, the judgment circuit 49 may be capable of increasing or decreasing the intervention threshold $G_{TH}$ by substantially the same value across the entire velocity range, as shown in FIG. 14. The lateral-skid acceleration that is tolerable to a rider may vary depending on the riding skills of the rider and the road surface condition. When the judgment circuit 49 is capable of increasing or decreasing the intervention threshold $G_{TH}$ by substantially the same value across the entire velocity range, the aforementioned variation can be accommodated, thereby realizing a longitudinal force control which is adapted to the riding skills of the rider and the road surface condition.

Although the intervention threshold $G_{TH}$ is substantially constant in the first velocity range VR1 in the examples illustrated above, there may not be a velocity range in which the intervention threshold $G_{TH}$ is substantially constant. Although the intervention threshold $G_{TH}$ linearly increases with increasing velocities of travel in the second velocity range VR2 in the examples illustrated above, it is not necessary for the increase to be linear; it may be a non-linear increase, for example.

Moreover, the motorcycle 1 and the longitudinal force control apparatus 31 according to the present embodiment may be modified as in (1) to (6) below.

(1) In the above embodiment, the velocity of travel of the motorcycle 1 is acquired based on the rotation speeds of the front wheel 8 and the rear wheel 23 detected by the front-wheel vehicle speed sensor 35 and the rear-wheel vehicle speed sensor 36, but this is not a limitation; the velocity of travel may be acquired (calculated) based on a moved distance and a moving time acquired by the GPS (Global Positioning System).

(2) In the above embodiment, lateral acceleration of the motorcycle 1 is detected by the lateral acceleration sensor 34. However, lateral acceleration may be acquired by the GPS.

(3) In the above embodiment, the motorcycle 1 includes an engine (internal combustion engine) as the motive power source. However, the motorcycle 1 may include a motor (electric motor) as the motive power source (i.e., it may be an electric motorcycle). In that case, increase or decrease in the driving force and braking force can also be controlled in terms of increase or decrease in the motor torque.

(4) Although the above embodiment illustrates the motorcycle 1 as an example of a saddled vehicle, this is not a limitation. Any saddled vehicle is applicable whose vehicle body will be banked.

(5) In the above embodiment, the bank angle acquisition circuit 46 acquires (calculates) a bank angle based on the velocity of travel (vehicle speed), yaw rate, and lateral acceleration, this is not a limitation; the roll rate may also be used in acquiring a bank angle. Moreover, the bank angle acquisition circuit 46 may acquire a bank angle based on a detection value of a distance meter which measures distance from the ground. Alternatively, a camera for imaging the front of the motorcycle 1 may be provided, and a bank angle may be calculated through image processing using an image which is obtained by such a camera.

(6) In the case where the motorcycle 1 includes a continuously variable transmission (CVT; Continuously Variable Transmission), the transmission ratio may be varied to increase or decrease torque, thereby reducing the longitudinal force.

According to an embodiment of the present invention, there is provided a longitudinal force control apparatus which can exert a highly accurate longitudinal force control irrespective of the bank angle during curving. The longitudinal force control apparatus according to an embodiment of the present invention is suitably used for various saddled vehicles such as motorcycles.

The present invention, or the pertinent component, may take the form of an entirely hardware embodiment, an entirely software embodiment (including firmware, resident software, micro-code, etc.) or an embodiment combining software and hardware aspects that may all generally be referred to herein as a "circuit," "module" or "system."

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2013-218224 filed on Oct. 21, 2013, the entire contents of which are hereby incorporated by reference.

What is claimed is:

1. A longitudinal force control apparatus comprising:
a lateral acceleration acquisition section configured to acquire a lateral acceleration, the lateral acceleration being an acceleration along a right-left direction acting on a vehicle;
a bank angle acquisition circuit configured to acquire a bank angle of the vehicle; and
a longitudinal force controller configured to decrease an absolute value of a longitudinal force at least with respect to a driving wheel of the vehicle based on the acquired lateral acceleration and the bank angle, the longitudinal force being a sum of forces along a front-rear direction acting on the driving wheel, the longitudinal force controller including
a lateral-skid acceleration calculation circuit configured to at least calculate a lateral-skid acceleration of the driving wheel based on at least the acquired lateral acceleration and the bank angle, and
a judgment circuit configured to determine whether the calculated lateral-skid acceleration is equal to or greater than a predetermined threshold,
the longitudinal force controller determining first and second velocity ranges, the second velocity range being greater in velocity than the first velocity range, the threshold being greater when a velocity of travel of the vehicle is in the second velocity range than when the velocity of travel of the vehicle is in the first velocity range.

2. The longitudinal force control apparatus of claim 1, wherein the threshold is substantially constant in the first velocity range.

3. The longitudinal force control apparatus of claim 1, wherein in the second velocity range, the threshold increases as the velocity of travel increases.

4. The longitudinal force control apparatus of claim 1, wherein the longitudinal force controller further determines a third velocity range that is greater in velocity than the second velocity range,
wherein the threshold is set in the third velocity range so that reduction of any longitudinal force by the longitudinal force controller is substantially not performed in the third velocity range.

5. The longitudinal force control apparatus of claim 1, wherein the judgment circuit is capable of modifying the threshold so as to increase or decrease the threshold by substantially a same value across all velocity ranges defined by the longitudinal force controller.

6. The longitudinal force control apparatus of claim 1, further comprising:
a yaw rate sensor configured to detect a yaw rate of the vehicle; and
a vehicle speed acquisition circuit configured to acquire the velocity of travel,
wherein
the longitudinal force controller decreases the absolute value of the longitudinal force based also on the yaw rate and the velocity of travel.

7. The longitudinal force control apparatus of claim 6, further comprising a roll rate sensor configured to detect a roll rate of the vehicle, wherein
the longitudinal force controller decreases the absolute value of the longitudinal force based also on the roll rate.

8. The longitudinal force control apparatus of claim 6, wherein the lateral-skid acceleration calculation circuit calculates the lateral-skid acceleration based also on the yaw rate and the velocity of travel.

9. The longitudinal force control apparatus of claim 1, wherein, the longitudinal force controller changes a decrease in the absolute value of the longitudinal force in accordance with a magnitude of the lateral-skid acceleration.

10. The longitudinal force control apparatus of claim 1, wherein, the longitudinal force controller changes a decrease in the absolute value of the longitudinal force in accordance with a difference between the lateral-skid acceleration and the threshold.

11. The longitudinal force control apparatus of claim 10, wherein the longitudinal force controller changes the decrease in the absolute value further based upon an amount of change of the lateral-skid acceleration per unit time.

12. The longitudinal force control apparatus of claim 1, wherein the longitudinal force controller changes a decrease in the absolute value of the longitudinal force in accordance with an amount of change of the lateral-skid acceleration per unit time.

13. The longitudinal force control apparatus of claim 1, further comprising:
   a driving force estimation circuit configured to estimate a driving force acting on the driving wheel;
   a braking force estimation circuit configured to estimate a braking force acting at least on the driving wheel; and
   a longitudinal force estimation circuit configured to estimate the longitudinal force as a sum of the driving force and the braking force acting at least on the driving wheel.

14. The longitudinal force control apparatus of claim 1, wherein the longitudinal force controller is capable of decreasing or increasing a driving force of the vehicle to thereby reduce the longitudinal force.

15. The longitudinal force control apparatus of claim 14, wherein the longitudinal force controller is capable of reducing the driving force by performing at least one selected from the group consisting of decreasing an injected amount of fuel, decreasing a transmission torque of a clutch, decreasing an ignition frequency of a spark plug, and lagging an ignition timing of the spark plug.

16. The longitudinal force control apparatus of claim 14, wherein the longitudinal force controller is capable of decreasing or increasing a braking force of the vehicle to thereby reduce the longitudinal force.

17. A saddled vehicle comprising the longitudinal force control apparatus of claim 1.

18. The longitudinal force control apparatus of claim 1, wherein the longitudinal force controller further comprises a longitudinal-force reduction controller,
   wherein the longitudinal-force reduction controller is responsive to a determination from the judgment circuit that the calculated lateral-skid acceleration is equal to or greater than the predetermined threshold by reducing the longitudinal force at least with respect to the driving wheel.

\* \* \* \* \*